(12) United States Patent
Reiter (10) Patent No.: US 11,116,265 B2
(45) Date of Patent: Sep. 14, 2021

(54) MAGNETIC FASTENER PROVIDING ELECTRICAL CONNECTION AND HAVING FEMALE MEMBER WITH SOLID COVER

(71) Applicant: ROMED FASTENERS, INC., Milford, CT (US)

(72) Inventor: Howard J. Reiter, Orange, CT (US)

(73) Assignee: Romed Fasteners, Inc., Woodbridge, CT (US)

(*) Notice: Subject to any disclaimer, the term of this patent is extended or adjusted under 35 U.S.C. 154(b) by 0 days.

(21) Appl. No.: 16/809,918

(22) Filed: Mar. 5, 2020

(65) Prior Publication Data

US 2020/0196692 A1 Jun. 25, 2020

Related U.S. Application Data

(63) Continuation-in-part of application No. 16/021,863, filed on Jun. 28, 2018, now Pat. No. 10,609,967.

(60) Provisional application No. 62/608,292, filed on Dec. 20, 2017.

(51) Int. Cl.
| | |
|---|---|
| *A41F 1/00* | (2006.01) |
| *A44B 13/00* | (2006.01) |
| *H01R 13/62* | (2006.01) |
| *H01R 13/627* | (2006.01) |

(52) U.S. Cl.
CPC .......... *A41F 1/002* (2013.01); *A44B 13/0082* (2013.01); *H01R 13/6205* (2013.01); *H01R 13/627* (2013.01)

(58) Field of Classification Search
CPC ...... H01R 33/00; H01R 13/627; A44D 1/005; A44B 17/0064; A44B 17/0041; A44B 17/0088; A44B 17/0094
See application file for complete search history.

(56) References Cited

U.S. PATENT DOCUMENTS

| | | | |
|---|---|---|---|
| 688,278 | A | 12/1901 | Adams |
| 3,457,601 | A | 7/1969 | Prym |
| 3,466,714 | A | 9/1969 | Nysten |
| 4,000,547 | A | 1/1977 | Eisenpresser |
| D247,468 | S | 3/1978 | Morita |
| 4,112,941 | A | 9/1978 | Larimore |

(Continued)

FOREIGN PATENT DOCUMENTS

GB 1519246 7/1978

*Primary Examiner* — Briggitte R. Hammond
(74) *Attorney, Agent, or Firm* — Wolf, Greenfield & Sacks, P.C.

(57) ABSTRACT

An electrically conductive magnetic snap fastener for releasably coupling a first material to a second material, the fastener including a male fastening element having a stud and stud flange affixable to the first material, and a female fastening element affixable to the second material and including a cover and a magnet disposed within a cavity defined by the cover, and defining a channel into which the stud is insertable, the female fastening element being electrically conductive at least in a portion disposed for electrically conductive contact with the male fastening element when the stud is inserted in the channel, and the cover being a unitary member of electrically conductive metal, wherein the channel is a distally closed and proximally open socket defined by a continuous wall portion of the cover for receiving the stud and preventing passage of liquid through the channel to the magnet.

24 Claims, 6 Drawing Sheets

(56) References Cited

U.S. PATENT DOCUMENTS

| | | |
|---|---|---|
| 4,751,773 A | 6/1988 | Nysten |
| 5,004,425 A | 4/1991 | Hee |
| 5,473,799 A | 12/1995 | Aoki |
| D367,438 S | 2/1996 | Schriever |
| 5,572,773 A | 11/1996 | Bauer |
| 5,600,099 A | 2/1997 | Crotzer |
| 5,722,126 A | 3/1998 | Reiter |
| 5,937,487 A | 8/1999 | Bauer |
| 6,319,015 B1 | 12/2001 | Faunce |
| 6,564,434 B1 | 5/2003 | Morita |
| 6,895,642 B2 * | 5/2005 | Huang .................... A47G 1/17 24/303 |
| 7,178,207 B2 | 2/2007 | Wong |
| 7,402,045 B2 | 7/2008 | Schwartzbart |
| 8,259,460 B2 | 9/2012 | Bhattacharya |
| 8,650,723 B2 | 2/2014 | Reiter |
| 8,814,574 B2 | 8/2014 | Selby |
| 8,886,281 B2 | 11/2014 | Pemu |
| 9,627,804 B2 | 4/2017 | Barth |
| 9,812,812 B2 | 11/2017 | Komoto |
| 10,609,967 B2 | 4/2020 | Reiter |
| 2012/0028479 A1 | 2/2012 | Chuang |
| 2015/0033507 A1 | 2/2015 | Brigato |
| 2016/0121098 A1 | 5/2016 | Kockx |
| 2016/0181729 A1 | 6/2016 | Barth |

\* cited by examiner

MAGNETIC FASTENER PROVIDING ELECTRICAL CONNECTION AND HAVING FEMALE MEMBER WITH SOLID COVER

CROSS-REFERENCE TO RELATED APPLICATIONS

This application is a continuation-in-part of allowed copending U.S. patent application Ser. No. 16/021,863, filed Jun. 28, 2018, which claims the priority benefit under 35 U.S.C. § 119(e) of U.S. provisional patent application No. 62/608,292, filed on Dec. 20, 2017, the entire contents of both of the aforesaid applications being incorporated herein by this reference.

BACKGROUND OF THE INVENTION

This invention relates to magnetic fasteners providing an electrical connection, of the general type exemplified by fasteners disclosed in allowed copending U.S. patent application Ser. No. 16/021,863, filed Jun. 28, 2018, having a male portion and a female portion. More particularly, it relates to such fasteners wherein the female portion has a solid cover receiving the male portion.

Magnetic snap fasteners are commonly used to provide convenient releasable coupling of two or more components and/or materials in articles such as clothing, bags, purses, shoes, and the like. Magnetic snap fasteners typically include a male portion attached to a first component or base material that is designed to releasably mate with a female portion attached to a second component or base material. Accordingly, mating of the male and female portions of the fastener facilitate coupling the first and second components together. In a typical magnetic fastener, the female portion includes a magnet and the male portion includes a material that is magnetically attracted to the magnet contained in the female portion. Accordingly, the magnetic attraction between the male and female portions enables the releasable coupling of the male and female portions of the magnetic fastener.

Recently, advances in technology have enhanced the portability of many electrical devices, and this has contributed to a dramatic increase in wearable devices and wearable technology. These types of devices can employ magnetic snaps, and can benefit from fasteners that can also simply and elegantly conduct electrical signals. For example, it may be useful for snaps employed in wearable devices such as heart monitors to provide electrical connections to conduct electrical signals. These devices can also utilize inexpensive components which can be disposed of after a single use.

SUMMARY OF THE INVENTION

The present invention, in particular aspects, contemplates the provision of an electrically conductive magnetic snap fastener for releasably coupling a first material to a second material, the fastener comprising a male fastening element affixable to the first material, the male fastening element including an integrally formed stud and stud flange; and a female fastening element affixable to the second material, the female fastening element including a cover and a magnet disposed within a cavity defined by the cover, the female fastening element having a channel into which the stud is insertable, the cover being a unitary member of electrically conductive metal, wherein the channel is a distally closed and proximally open socket or recess defined by a continuous wall portion of the cover for receiving the stud and preventing passage of liquid through the channel to the magnet, the male fastening element and the female fastening element being magnetically couplable to each other such that the male fastening element contacts the female fastening element to form a conductive electrical path through the male fastening element and the female fastening element when the male fastening element and the female fastening element are magnetically coupled to each other.

In the fasteners of the invention, the male fastening element may contact the cover of the female fastening element, and the conductive electrical path may be formed through at least the male fastening element and the cover. The female fastening element may include a back plate having at least one leg for affixing to the second material. The male fastening element may contact the cover of the female fastening element, such that a conductive electrical path is formed through at least the male fastening element, the cover and the back plate. In other embodiments, the female fastening element may include an eyelet and a rivet fixedly insertable therein for affixing to the second material, and the rivet may be crush-fit into the eyelet.

The channel may have a distally tapering frustoconical configuration and may terminate distally in a cylindrical portion for receiving a distal extremity of the stud. The magnet may be annular and may laterally surround the recess-defining wall portion of the cover, and an annular peripheral portion of the cover, continuous with said recess-defining wall portion, may laterally surround the magnet. Also, the male fastening element may be disposable.

More generally, the invention broadly embraces a magnetic snap fastener for releasably coupling a first material to a second material, the fastener comprising a male fastening element affixable to the first material, the male fastening element including an integrally formed stud and stud flange formed from a single piece of ferromagnetic material, and a female fastening element affixable to the second material, the female fastening element including a cover and a magnet disposed within a cavity defined by the cover, the female fastening element having a channel into which the stud is insertable, the cover being a unitary member of electrically conductive metal, wherein the channel is a distally closed and proximally open socket or recess defined by a continuous wall portion of the cover for receiving the stud and preventing passage of liquid through the channel to the magnet; and the male fastening element and the female fastening element providing magnetic coupling to releasably couple the first and second materials.

Again, the magnet may be annular and may laterally surround the recess-defining wall portion of the cover, and an annular peripheral portion of the cover, continuous with said recess-defining wall portion, may laterally surround the magnet.

In a further aspect, the invention contemplates an electrical device comprising a first portion having a male fastening element affixed thereon, the male fastening element including an integrally formed stud and stud flange; and a second portion having a female fastening element affixed thereon, the female fastening element including a cover and a magnet disposed within a cavity defined by the cover, the female fastening element having a channel into which the stud is insertable, the cover being a unitary member of electrically conductive metal, wherein the channel is a distally closed and proximally open socket or recess defined by a continuous wall portion of the cover for receiving the stud and preventing passage of liquid through the channel to the magnet; and the male fastening element and the female fastening element being magnetically couplable to each other such that the male fastening element contacts the female fastening element to form a conductive electrical path from the first portion to the second portion through the male fastening element and the female fastening element when the male fastening element and the female fastening element are magnetically coupled to each other. The electrical device may further comprise a sensor, which may include at least one of a heart sensor or a fitness tracker.

In a specific sense, the invention further embraces an electrically conductive magnetic snap fastener for releasably coupling a first material to a second material, the fastener comprising a male fastening element affixable to the first material, including an integrally formed stud and stud flange, having a hollow cavity and stamped or drawn from a single piece of electrically conductive ferromagnetic sheet metal, and an electrically conductive post to affix the male fastening element to the first material, the post including a post portion, press-fitted or crush-fitted into the hollow cavity in electrically conductive contact with an interior surface of the stud, and a flange portion spaced from the stud flange such that the first material lies between and in contact with the stud flange and the flange portion of the post when the male fastening element is affixed thereto; and a female fastening element affixable to the second material, the female fastening element including a cover and a magnet disposed within a cavity defined by the cover, the female fastening element defining a channel into which the stud is insertable, the cover being a unitary member of electrically conductive metal disposed for electrically conductive contact with the male fastening element when the stud is inserted in the channel, wherein the channel is a distally closed and proximally open socket or recess defined by a continuous wall portion of the cover for receiving the stud and preventing passage of liquid through the channel to the magnet; the male fastening element and the female fastening element being magnetically couplable to each other when the stud is inserted in the channel, such that the male fastening element contacts the female fastening element to form a conductive electrical path through the male fastening element and the female fastening element when the male fastening element and the female fastening element are magnetically coupled to each other. The female element may further include a back plate having at least one leg for affixing to the second material, the male fastening element may contact the cover of the female fastening element, and the conductive electrical path may be formed through at least the male fastening element, the cover and the back plate. Once more, the male fastening element may be disposable. The post may be made of a plastic and coated with an electrically conductive material.

In another aspect the invention embraces an electrical device selected from the group consisting of wearable consumer electronics, diagnostic devices and therapeutic devices, more specifically epilepsy devices, stimulators, monitors, pulmonary devices and neurowave transmitters and receivers, particularly exemplified by heart monitors and electrocardiogram devices, comprising an electrically conductive magnetic snap fastener as described above, a first portion of the device as the first material, having the male fastening element affixed thereto; and a second portion of said device as the second material, electrically connected to the female fastening element and having the female fastening element affixed thereto.

In yet another aspect, the invention contemplates the provision of a component for a magnetic snap fastener for releasably coupling a first material to a second material, the component comprising a male fastening element affixable to the first material, the male fastening element being disposable and comprising an integrally formed stud and stud flange, having a hollow cavity and stamped or drawn from a single piece of electrically conductive ferromagnetic sheet metal; and an electrically conductive post to affix the male fastening element to the first material, the post including a post portion, press-fitted or crush-fitted into the hollow cavity in electrically conductive contact with an interior surface of the stud, and a flange portion spaced from the stud flange such that the first material lies between and in contact with the stud flange and the flange portion of the post when the male fastening element is affixed thereto, wherein the component is configured to magnetically couple with a female fastening element affixable to the second material, the female fastening element including a cover and a magnet disposed within a cavity defined by the cover, the female fastening element having a channel into which the stud is insertable, the cover being a unitary member of electrically conductive metal, wherein the channel is a distally closed and proximally open socket or recess defined by a continuous wall portion of the cover for receiving the stud and preventing passage of liquid through the channel to the magnet, the female element being electrically conductive at least in a portion disposed for electrically conductive contact with the male fastening element when the stud is inserted in the channel, and the male fastening element and the female fastening element being magnetically couplable to each other when the stud is inserted in the channel, such that the male fastening element contacts the female fastening element to form a conductive electrical path through the male fastening element and the female fastening element when the male fastening element and the female fastening element are magnetically coupled to each other.

Further features and advantages of the invention will be apparent from the detailed description hereinafter set forth, together with the accompanying drawings.

DETAILED DESCRIPTION

For purposes of illustration, the invention will be described as embodied in a magnetic snap fastener that can provide an electrical connection for the conduction of electrical signals without the use of a separate electrical conductor. The Figures show an exemplary magnetic fastener 1000 in a separated/unmated arrangement and a mated/coupled arrangement, according to an embodiment of the present invention. As shown in FIGS. 1, 2 and 4-7, the magnetic fastener 1000 can include a female portion or element 1100 and a male portion or element 1200. The female portion 1100 and male portion 1200 can each be attached to a component and/or base material, respectively designated 100 and 102 in FIG. 6, and can be configured to releasably mate with each other (e.g., include complementary shapes) so as to releasably couple the components and/or base materials to which they are attached.

The female portion 1100 can include a back plate 1102, a cover 1108 of electrically conductive metal, a magnetic ring 1106 disposed within the cover 1108, and a central channel 1110. The metal of the cover may, for example, be a magnetic stainless steel, or may be non-magnetic or weakly ferromagnetic, such as brass (non-magnetic) with or without a light plating of nickel (ferromagnetic). According to an embodiment, the cover 1108 can define a ring-shaped cavity having a substantially cylindrical outer wall 105, and the magnetic ring 1106 can be disposed therein. The male portion 1200 can include a stud flange 1202 and a stud 1204. According to certain exemplary embodiments, the male portion 1200 can be a one-piece stud, such that the stud flange 1202 and the stud 1204 are integrally formed. For example, the male portion 1200 can be stamped, formed, or drawn from the ferromagnetic material (e.g. a magnetic stainless steel) from which it is made so that the flange 1202 and the stud 1204 are integrally formed from a single piece of material, such as sheet metal. This can provide an inexpensive and efficient magnetic closure which could be used for garments, apparel, and many other applications. According to certain exemplary embodiments, the male portion 1200 can be made inexpensively such that it is a disposable component. For example, the male portion 1200 can be designed to be disposable after one or more uses.

Figures 1, 2, 3:
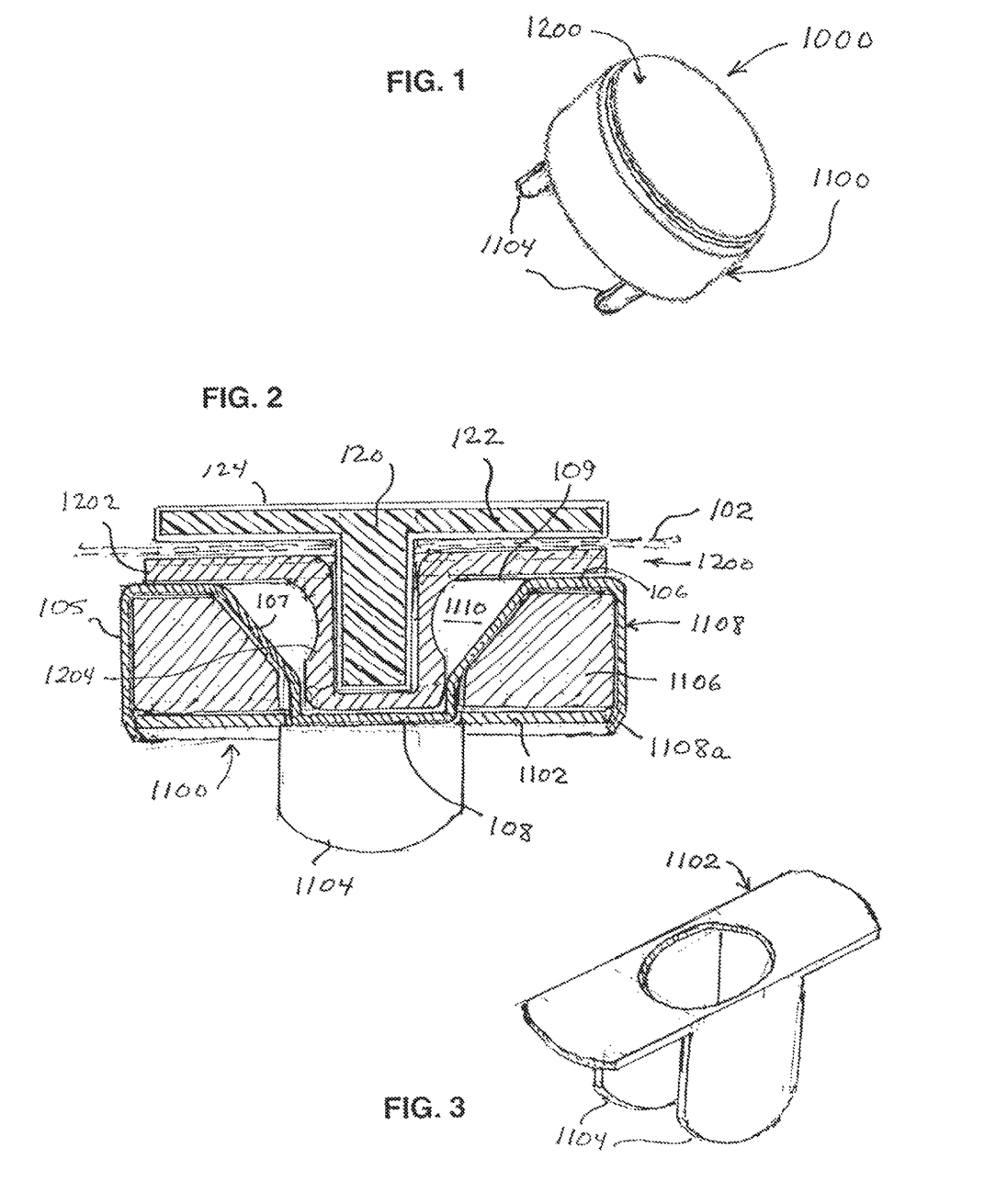
FIG. 1 is a perspective view of an exemplary magnetic snap fastener embodying the invention in a particular form.
FIG. 2 is a cross-sectional view of the magnetic snap fastener of FIG. 1.
FIG. 3 is a perspective view of the back plate of the magnetic snap fastener of FIG. 1.

The back plate 1102, as illustrated in FIG. 3, can include one or more legs 1104, which can facilitate coupling the female portion 1100 to the component and/or material 100 (e.g., printed circuit board, etc.) to be coupled. According to certain exemplary embodiments, the legs 1104 can be integrally formed as part of the back plate 1102 (e.g., formed by folding portions of the back plate 1102 to form legs 1104) and the back plate 1102 can include a ferromagnetic and/or conductive material. The cover 1108 can include a continuous crimp or rim 1108*a*, which can secure the back plate 1102 without the need for additional mechanical attachment mechanisms to secure the back plate 1102. Further, cover 1108, magnet 1106 and back plate 1102 can be configured to create a seal therebetween such that fluids cannot enter the internals of magnetic fastener 1000; magnetic fastener 1000 can include additional washers or other sealing elements to prevent fluids from entering the internals of magnetic fastener 1000.

Preferably, the male portion 1200 includes a metal ferromagnetic material so that it is magnetically attracted to the magnetic ring 1106 of the female portion 1100. For example, the shape of the male portion 1200 and female portion 1100 channel the magnetic flux of the magnetic ring 1106 of the female portion 1100 through the center of the magnetic ring so that the flux of the magnet is used effectively to magnetically attract the male portion 1200 and female portion 1100 to one another.

Additionally, the male portion 1200 and female portion 1100 can include coupling elements to facilitate coupling of the male portion 1200 and female portion 1100 to their respective component and/or base material 102 and 100. According to certain exemplary embodiments, the male portion 1200 and female portion 1100 can include, e.g., connectors, solder pads, etc. to facilitate coupling the male portion 1200 and female portion 1100 to their respective component and/or base material (e.g., PCBs, connectors, etc.) and provide an electrical connection between their respective components and/or base materials (e.g., PCB, connector, etc.). For example, as further described below with reference to FIGS. 8A-8C, the male portion 1200 can be coupled to its component and/or base material 102 via a post 120 (e.g., metal, plastic, plastic coated with conductive material, etc.) disposed within a hollow cavity 1206 of the stud 1204 so that the male portion 1200 can be crush fit or press fit onto its component and/or base material.

The legs 1104 of the female portion 1100 can provide electrical connectivity of the female portion to its component and/or base material 100. Accordingly, when the male portion 1200 is mated to the female portion 1100, an electrical connection can be provided from the male portion 1200 (e.g., via stud 1204 or stud flange 1202) to the female portion 1100 (via cover 1108) without requiring an additional separate conductor.

In operation, the female portion 1100 and the male portion 1200 are magnetically attracted to each other in view of the magnetic ring 1106 and the ferromagnetic material of the male portion 1200. For example, the shape of the male portion 1200 and the female portion 1100 channel the magnetic flux of the magnetic ring 1106 of female portion 1100 through the center of the magnetic ring so that the flux of the magnet is used effectively to magnetically attract the male portion 1200 and female portion 1100 to one another. The magnetic attraction can releasably mate male portion 1200 to female portion 1100 and the contact between male portion 1200 and female portion 1100 can provide the electrical connection, without the need for a separate conductor. For example, stud 1204 can be received in central channel 1110, and the magnetic attraction releasably couples male portion 1200 to female portion 1100. FIGS. 1 and 2 show the magnetic fastener 1100 in a mated, coupled arrangement. According to an exemplary embodiment of the present invention, the electrical connection can be made through the contact made between the stud flange 1202 and the cover 1108 without a separate conductor.

Figure 4:
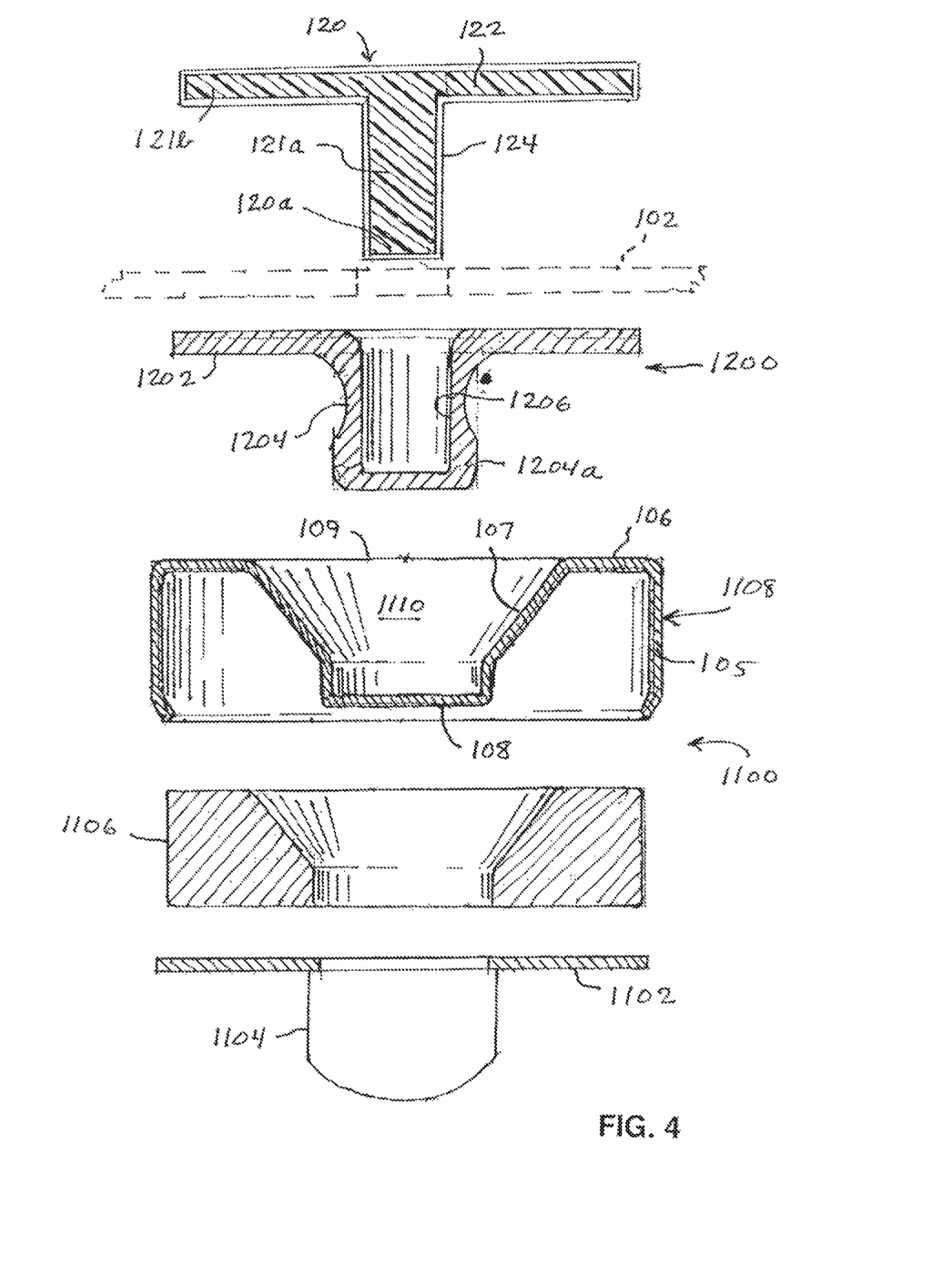
FIG. 4 is an exploded cross-sectional view of the magnetic snap fastener of FIG. 1.
Figure 5:
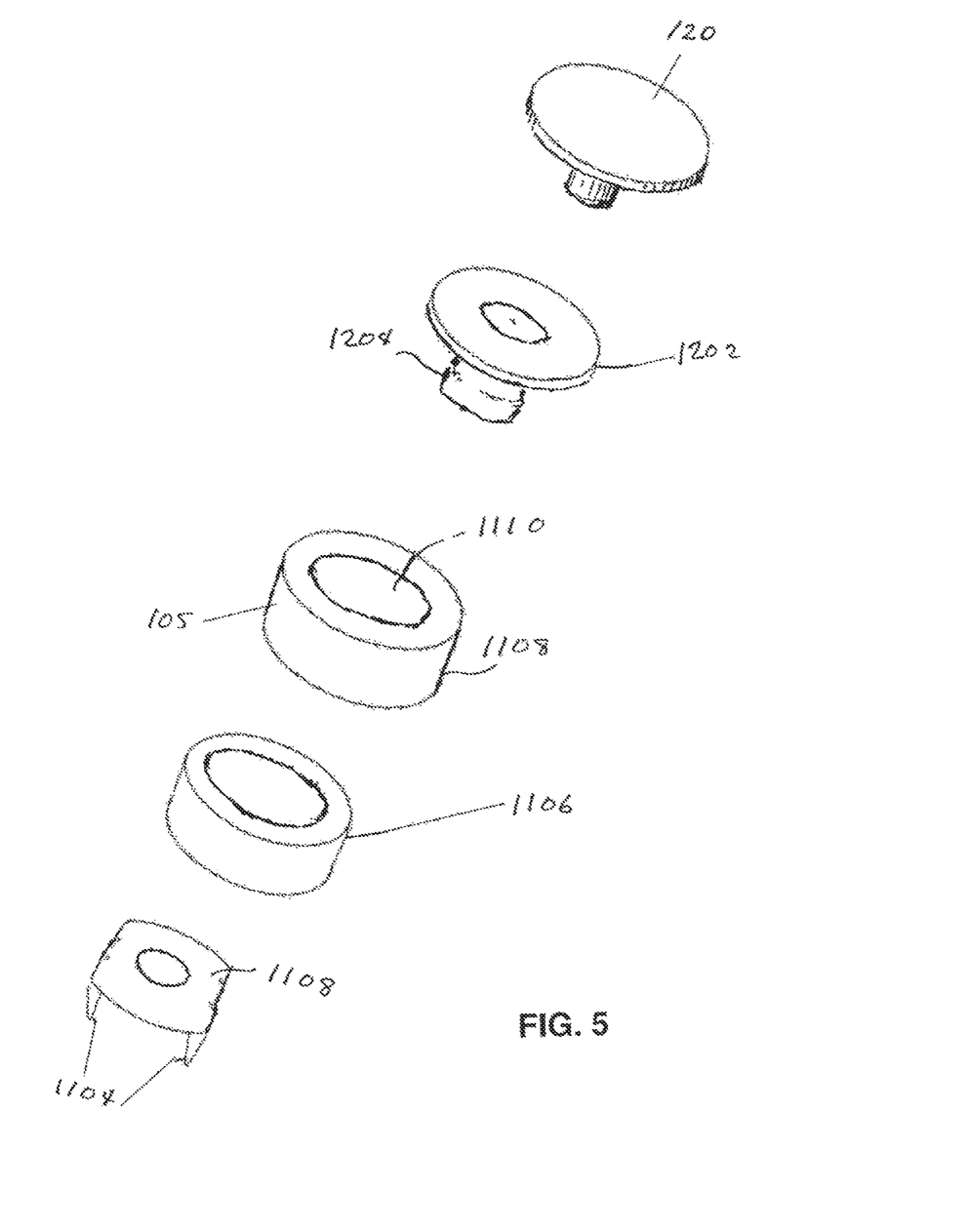
FIG. 5 is an exploded perspective view of the magnetic snap fastener of FIG. 1.

FIGS. 4 and 5 show exploded perspective views of the male and female portions. As there illustrated, the female portion 1100 can include the cover 1108 with the central channel 1110, the magnet ring 1106, and the back plate 1102. The magnet ring 1106 can be received in the cover 1108, and the back plate 1102 can be coupled to the cover 1108 to maintain the magnet ring 1106 within the cover 1108. Also shown in FIGS. 4 and 5 are legs 1104, which can be integrally formed as part of the back plate 1102.

Figure 6:
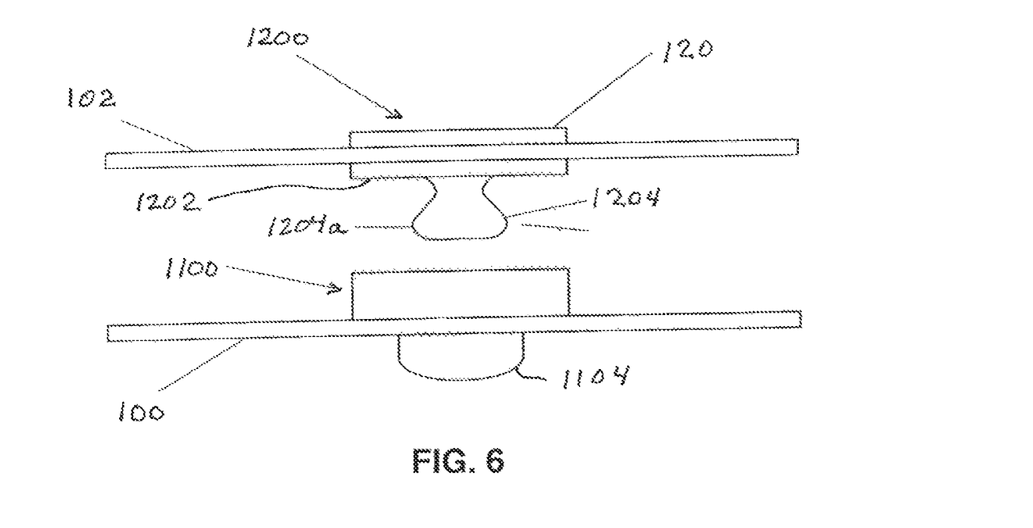
FIG. 6 is a schematic side elevational view of the male and female elements of an exemplary magnetic snap fastener according to an embodiment of the present invention, showing the male and female elements respectively fixed to the first material and the second material, before the male and female elements are coupled together.

FIG. 6 shows the exemplary magnetic fastener 1000 in a separated/unmated arrangement with each of the male and female portions attached to their respective components and/or base materials. As illustrated in FIG. 6, the female portion 1100 can be attached to component/base material 100 and the male portion 1200 can be attached to component/base material 102. According to certain exemplary embodiments, as shown in FIG. 6, the stud 1204 can include features such as a flared protrusion 1204a to facilitate the coupling and mating of the male portion 1200 with the female portion 1100. As male portion 1200 and female portion 1100 are releasably mated to each other, components/base materials 100 and 102 are preferably releasably coupled to each other.

Figure 7:
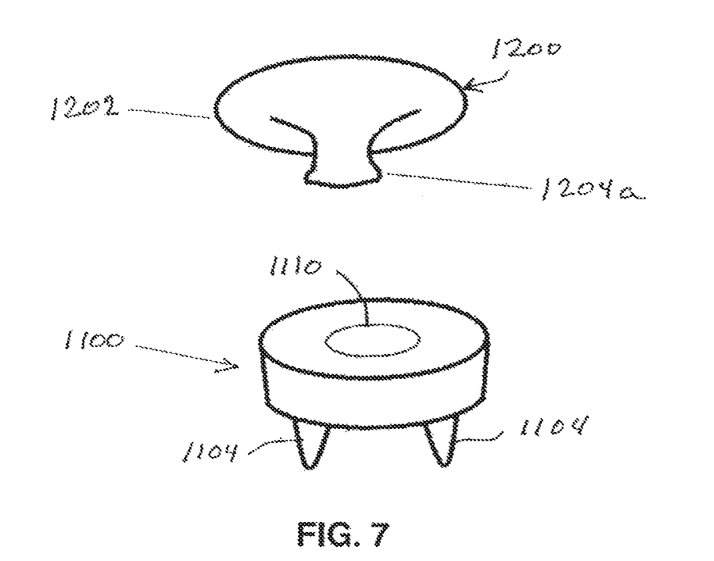
FIG. 7 is a schematic perspective view of the male and female elements of an exemplary magnetic snap fastener according to an embodiment of the present invention, before the male and female elements are coupled together.

FIG. 7 shows a further perspective view of exemplary magnetic fastener 1000 in a separated/unmated arrangement showing flared protrusion 1204a of stud 1204, which can facilitate the releasably mating of male portion 1200 with female portion 1100. The male portion 1200 is preferably formed (e.g., stamped, formed, or drawn from the ferromagnetic material from which it is made) so that the flange 1202 and stud 1204, including protrusions 1204a, are integrally formed from a single piece of material.

Figure 8A:
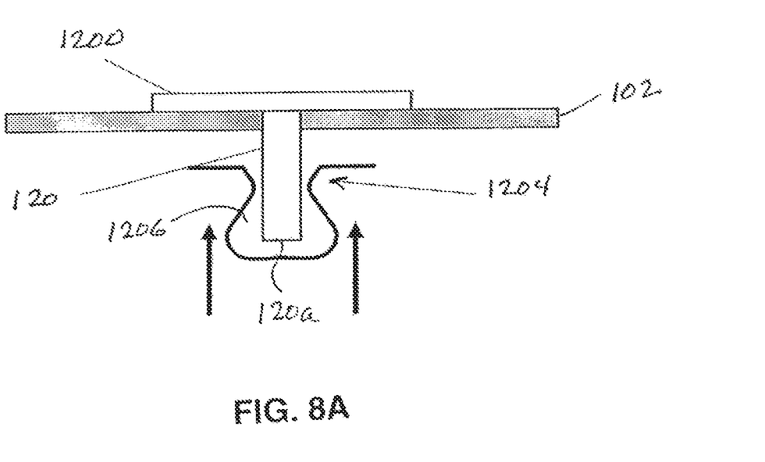
FIG. 8A is a schematic cross-sectional view of the male components for an exemplary magnetic snap fastener according to an embodiment of the present invention.
Figure 8B:
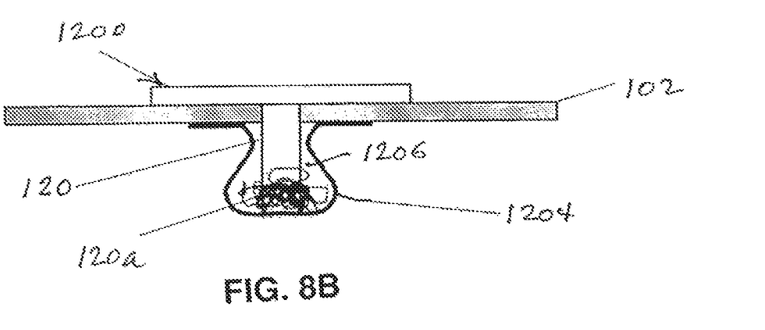
FIG. 8B is a schematic cross-sectional view of the male components for an exemplary magnetic snap fastener according to an embodiment of the present invention.
Figure 8C:
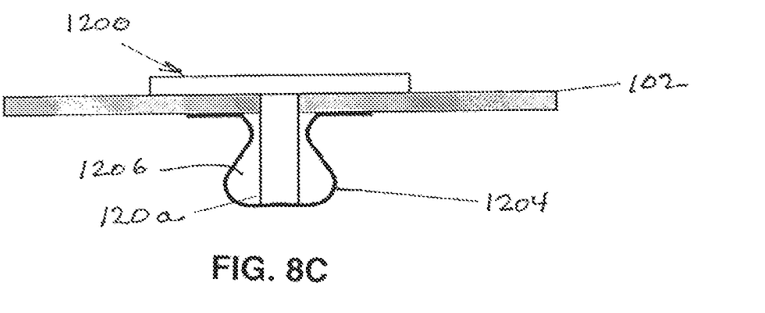
FIG. 8C is a schematic cross-sectional view of the male components for an exemplary magnetic snap fastener according to an embodiment of the present invention.

As shown in FIGS. 8A-8C, the male portion 1200 can be coupled onto component/base material 102 via the post 120. FIGS. 8A, 8B, and 8C illustrate exemplary attachments of the male portion 1200 to a component/base material, such as, for example, plastic, textile, or other material. FIG. 8A shows coupling of the stud 1204 onto post 120 via, for example, a press fit or crush fit type attachment. The post includes a post portion 121a fitted into cavity 1206 of stud 1204 in electrically conductive contact therewith, and a flange portion 121b spaced from the stud flange 1202 such that the base material 102 lies between and in contact with the stud flange and the flange portion of the post when the male portion 1200 is affixed thereto.

FIG. 8B shows stud 1204 coupled to a crush attached post 120 (e.g., "crush-fit"). For example, post 120 can be designed and configured such that tip portion 120a can be crushed/deformed when compressed within the cavity 1206 of stud 1204. Further, the portion configured to "crush" within a hollow cavity of stud 1204 as the male portion 1200 is coupled to material 102 can include an electrically conductive material and can contact an interior surface of the cavity of electrically conductive stud 1204 to provide electrical conductivity. For example, as shown in FIGS. 2 and 4, the post 120 may be a unitary molded plastic element 122 entirely clad with an electrically conductive metal coating 124 such as a silver coating. Alternatively, the post 120 can be made from sheet metal or pressed from solid material. The post 120 can include a hollow tube with an open or closed tip, or alternatively, the post 120 can include a semi tubular solid post. As shown in FIG. 8A, the stud 1204 and post 120 can be driven together until the post tip 120a is deformed/crushed and expands within the cavity of the stud 1204 to lock the two components together.

FIG. 8C shows the stud 1204 coupled to post 120 via a drive or press fit arrangement. In this configuration, the diameter of post 120 is preferably greater than the diameter of the opening or cavity 1206 in the back of stud 1204 such that the frictional force created between an interior surface of stud 1204 and post 120 holds the two components together. Similar to the crush-fit arrangement shown in FIG. 8B, contact of post 120 with an interior surface of stud 1204 can provide electrical conductivity in this arrangement.

As a particular feature of the present invention, the cover 1108 of the female portion 1100 is a unitary member of electrically conductive metal including the outer cylindrical wall 105, the proximal surface 106 facing the stud flange 1202 of the male member 1200, and the inner annular wall 107 laterally surrounding and distally closing the central channel 1110. That is to say, the channel 1110 is a distally closed and proximally open socket or recess defined by a continuous wall portion 107 of the cover 1108 for receiving the stud 1204 and preventing passage of liquid through the channel to the magnet 1106. The terms "distally" and "proximally" herein refer, respectively, to the extremities of the channel remote from and closest to the stud flange 1202 in the assembled fastener 1000. Thus, the closed distal end of the channel 1110 is designated 108 and the open proximal end of the channel is designated 109 in FIGS. 2 and 4.

The provision of a closed-ended channel in a continuous, unitary cover member affords important advantages in the case of fasteners used in heart monitors, electrocardiograph devices and the like, where the male member 1200 is attached to and/or forms part of an electrode detachably adhered to a patient's skin. This structural feature protects the fastener magnet from moisture from a patient's skin or from a sterilization procedure such as wiping.

Also preferably or advantageously, the channel 1110 defined by wall 107 has a frustoconical or beveled configuration tapering from a maximal aperture at the proximal end to a short cylindrical closed distal terminus for receiving the end of the fully inserted stud 104. It will be appreciated that as the male portion is moved manually toward the female portion, the stud is pulled strongly toward the female portion and may be difficult to center precisely as it enters the channel; the frustoconical taper of the closed-channel wall guides the advancing stud into properly centered position seated in the distal end of the channel.

The central opening of the ring-shaped magnet 1106 has a corresponding frustoconical configuration to conform to the outer surface of the channel-defining cover wall 107, which cooperates with cover wall 105 to define the ring-shaped cavity that receives the magnet in the female portion 1100.

In the described embodiment of the invention, the electrical path is from the electrode contact area (with the patient) through the plastic post's coating of silver, to the stud body, and to the magnet by contact of the stud flange to the face of the cover (and/or contact of the stud tip with the cover at the distal end of the channel), and then from the body of the cover to the back plate and its legs. The legs may (for example) be soldered to a wire, or soldered to a board, or a clip connector may attach to the end of the leg.

Figure 9:
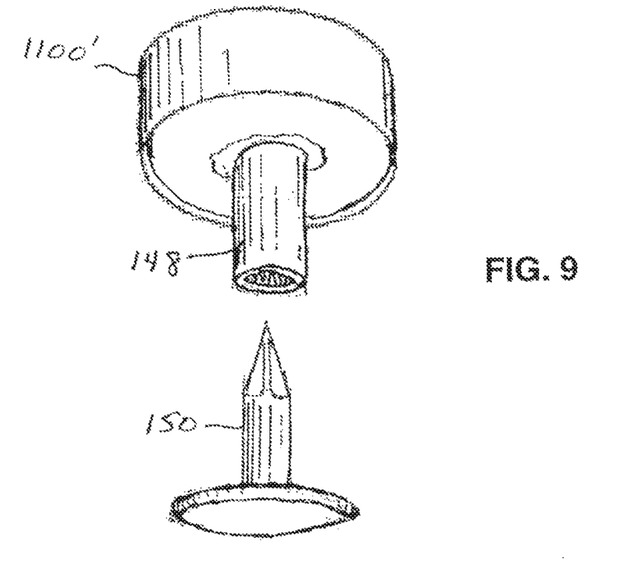
FIGS. 9 and 10 are, respectively, disassembled and assembled views of another embodiment of the invention.
Figure 10:
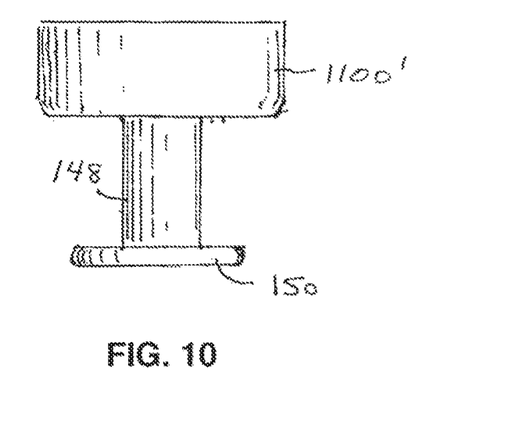

The female portion may be connected to component or material 100 in alternative ways. For instance, it could be soldered to a PC board. In another arrangement, shown in FIGS. 9 and 10, an eyelet 148 mounted on the distal side (back) of the female portion 1100' serves as a receptacle for a crushable rivet 150 that secures the female portion to the component or material (not shown in FIGS. 9 and 10.

Exemplary embodiments of the present invention can be utilized on a wide variety of products and devices. For example, the exemplary magnetic snap fasteners according to embodiments of the present invention can be used on various garments (e.g., coats, jackets, pants, shirts, sweaters, etc.), accessories (e.g., bags, jewelry, hats, umbrellas, etc.), or any other product that requires any type of closure and/or fastener. The exemplary magnetic snap fasteners according to embodiments of the present invention can also be used on devices or products requiring an electrically conductive fastener or closure. For example, the exemplary magnetic snap fasteners can be used on wearable devices and medical devices, such as heart monitors, electrocardiogram devices (EKG), watches, fitness trackers, navigation devices, media players, devices employing sensors, headphones, eyewear (e.g., googles, glasses, virtual-reality goggles, etc.), gloves, garments having sensors and/or smart fabrics, etc. In these applications, coupling the male and female portions of the exemplary magnetic fasteners can, for example, provide a conductive electrical connection to enable electrical connectivity between two portions of the device or product when the fastener is closed/coupled.

It is to be understood that the invention is not limited to the features and embodiments hereinabove specifically set forth, but may be carried out in other ways without departure from its spirit.

What is claimed is:

1. An electrically conductive magnetic snap fastener for releasably coupling a first material to a second material, the fastener comprising:
   a male fastening element affixable to the first material, the male fastening element including an integrally formed stud and stud flange; and
   a female fastening element affixable to the second material, the female fastening element including a cover and a magnet disposed within a cavity defined by the cover, the female fastening element having a channel into which the stud is insertable, the cover being a unitary member of electrically conductive metal, wherein the channel is a distally closed and proximally open socket or recess defined by a continuous wall portion of the cover for receiving the stud and preventing passage of liquid through the channel to the magnet, the male fastening element and the female fastening element being magnetically couplable to each other such that the male fastening element contacts the female fastening element to form a conductive electrical path through the male fastening element and the female fastening element when the male fastening element and the female fastening element are magnetically coupled to each other.

2. The electrically conductive magnetic snap fastener of claim 1, wherein the male fastening element contacts the cover of the female fastening element, and the conductive electrical path is formed through at least the male fastening element and the cover.

3. The electrically conductive magnetic snap fastener of claim 1, wherein the female fastening element includes a back plate having at least one leg for affixing to the second material.

4. The electrically conductive magnetic snap-fastener of claim 3, wherein the male fastening element contacts the cover of the female fastening element, and a conductive electrical path is formed through at least the male fastening element, the cover and the back plate.

5. The electrically conductive magnetic snap fastener of claim 1, wherein the female fastening element includes an eyelet and a rivet fixedly insertable therein for affixing to the second material.

6. The electrically conductive magnetic snap fastener of claim 5, wherein the rivet is crush-fit into the eyelet.

7. The electrically conductive magnetic snap fastener of claim 1, wherein the magnet is annular and laterally surrounds the recess-defining wall portion of the cover, and wherein an annular peripheral portion of the cover, continuous with said recess-defining wall portion, laterally surrounds the magnet.

8. The electrically conductive magnetic snap fastener of claim 1, wherein the male fastening element is disposable.

9. A magnetic snap fastener for releasably coupling a first material to a second material, the fastener comprising a male fastening element affixable to the first material, the male fastening element including an integrally formed stud and stud flange formed from a single piece of ferromagnetic material, and
a female fastening element affixable to the second material, the female fastening element including a cover and a magnet disposed within a cavity defined by the cover, the female fastening element having a channel into which the stud is insertable, the cover being a unitary member of metal, wherein the channel is a distally closed and proximally open socket or recess defined by a continuous wall portion of the cover for receiving the stud and preventing passage of liquid through the channel to the magnet; and
the male fastening element and the female fastening element providing magnetic coupling to releasably couple the first and second materials.

10. The magnetic snap fastener of claim 9, wherein the magnet is annular and laterally surrounds the recess-defining wall portion of the cover, and wherein an annular peripheral portion of the cover, continuous with said recess-defining wall portion, laterally surrounds the magnet.

11. The magnetic snap fastener of claim 9, wherein the female fastening element includes an eyelet and a rivet fixedly insertable therein for affixing to the second material.

12. The magnetic snap fastener of claim 11, wherein the rivet is crush-fit into the eyelet.

13. An electrical device, comprising:
   a first portion having a male fastening element affixed thereon, the male fastening element including an integrally formed stud and stud flange; and
   a second portion having a female fastening element affixed thereon, the female fastening element including a cover and a magnet disposed within a cavity defined by the cover, the female fastening element having a channel into which the stud is insertable, the cover being a unitary member of electrically conductive metal, wherein the channel is a distally closed and proximally open socket or recess defined by a continuous wall portion of the cover for receiving the stud and preventing passage of liquid through the channel to the magnet; and
   the male fastening element and the female fastening element being magnetically couplable to each other such that the male fastening element contacts the female fastening element to form a conductive electrical path from the first portion to the second portion through the male fastening element and the female fastening element when the male fastening element and the female fastening element are magnetically coupled to each other.

14. The electrical device of claim 13, further comprising a sensor.

15. The electrical device of claim 14, wherein the sensor includes at least one of a heart sensor or a fitness tracker.

16. An electrically conductive magnetic snap fastener for releasably coupling a first material to a second material, the fastener comprising:
   (a) a male fastening element affixable to the first material, including
      (i) an integrally formed stud and stud flange, having a hollow cavity and stamped or drawn from a single piece of electrically conductive ferromagnetic sheet metal, and
      (ii) an electrically conductive post to affix the male fastening element to the first material, said post including a post portion, press-fitted or crush-fitted into said hollow cavity in electrically conductive contact with an interior surface of the stud, and a flange portion spaced from the stud flange such that the first material lies between and in contact with the stud flange and the flange portion of the post when the male fastening element is affixed thereto; and (b) a female fastening element affixable to the second material, the female fastening element including a cover and a magnet disposed within a cavity defined by the cover, the female fastening element defining a channel into which the stud is insertable, the cover being a unitary member of electrically conductive metal disposed for electrically conductive contact with the male fastening element when the stud is inserted in the channel, wherein the channel is a distally closed and proximally open socket or recess defined by a continuous wall portion of the cover for receiving the stud and preventing passage of liquid through the channel to the magnet; the male fastening element and the female fastening element being magnetically couplable to each other when the stud is inserted in the channel, such that the male fastening element contacts the female fastening element to form a conductive electrical path through the male fastening element and the female fastening element when the male fastening element and the female fastening element are magnetically coupled to each other.

17. The electrically conductive magnetic snap fastener of claim 16, wherein the female fastening element further includes a back plate having at least one leg for affixing to the second material, the male fastening element contacts the cover of the female fastening element, and the conductive electrical path is formed through at least the male fastening element, the cover and the back plate.

18. The electrically conductive magnetic snap fastener of claim 16, wherein the male fastening element is disposable.

19. The electrically conductive magnetic snap fastener of claim 18, wherein the post is made of a plastic and coated with an electrically conductive material.

20. An electrical device selected from the group consisting of wearable consumer electronics, diagnostic devices and therapeutic devices, comprising:
an electrically conductive magnetic snap fastener as defined in claim 16;
a first portion of said device as the first material, having the male fastening element affixed thereto; and
a second portion of said device as the second material, electrically connected to the female fastening element and having the female fastening element affixed thereto.

21. The electrically conductive magnetic snap fattener of claim 16, wherein the channel has a distally tapering frustoconical configuration and terminates distally in a cylindrical portion for receiving a distal extremity of the stud; wherein the magnet is annular and laterally surrounds the recess-defining wall portion of the cover, and wherein an annular peripheral portion of the cover, continuous with said recess-defining wall portion, laterally surrounds the magnet.

22. A component for a magnetic snap fastener for releasably coupling a first material to a second material, the component comprising a male fastening element affixable to the first material, the male fastening element being disposable and comprising (a) an integrally formed stud and stud flange, having a hollow cavity and stamped or drawn from a single piece of electrically conductive ferromagnetic sheet metal; and (b) an electrically conductive post to affix the male fastening element to the first material, said post including a post portion, press-fitted or crush-fitted into said hollow cavity in electrically conductive contact with an interior surface of the stud, and a flange portion spaced from the stud flange such that the first material lies between and in contact with the stud flange and the flange portion of the post when the male fastening element is affixed thereto, wherein the component is configured to magnetically couple with a female fastening element affixable to the second material, the female fastening element including a cover and a magnet disposed within a cavity defined by the cover, the female fastening element having a channel into which the stud is insertable, the cover being a unitary member of electrically conductive metal, wherein the channel is a distally closed and proximally open socket or recess defined by a continuous wall portion of the cover for receiving the stud and preventing passage of liquid through the channel to the magnet, the female element being electrically conductive at least in a portion disposed for electrically conductive contact with the male fastening element when the stud is inserted in the channel, and the male fastening element and the female fastening element being magnetically couplable to each other when the stud is inserted in the channel, such that the male fastening element contacts the female fastening element to form a conductive electrical path through the male fastening element and the female fastening element when the male fastening element and the female fastening element are magnetically coupled to each other.

23. The magnetic snap fastener component of claim 22, wherein the male fastening element is configured to magnetically couple with a female fastening element as aforesaid which includes a cover and a back plate, and the conductive electrical path is formed through at least the male fastening element, the cover and the back plate.

24. The magnetic snap fastener component of claim 22, wherein the male fastening element is configured to magnetically couple with a female fastening element as aforesaid in which the channel has a distally tapering frustoconical configuration and terminates distally in a cylindrical portion for receiving a distal extremity of the stud; and the cover further includes an outer cylindrical portion surrounding the continuous channel-defining wall portion to define therewith the cavity, the cavity being annular and the magnet being annular to fit within the cavity in surrounding relation to the channel.

* * * * *